United States Patent
Thornes et al.

(10) Patent No.: US 12,491,013 B2
(45) Date of Patent: Dec. 9, 2025

(54) ORTHOPAEDIC IMPLANT AND SYSTEM

(71) Applicant: SOTA ORTHOPAEDICS LIMITED, Malahide (IE)

(72) Inventors: Brian Thornes, Malahide (IE); Ross Mcdonald, Howth (IE); Adam Bradshaw, Dublin (IE)

(73) Assignee: SOTA ORTHOPAEDICS LIMITED, Dublin (IE)

( * ) Notice: Subject to any disclaimer, the term of this patent is extended or adjusted under 35 U.S.C. 154(b) by 141 days.

(21) Appl. No.: 18/011,947

(22) PCT Filed: Jun. 22, 2021

(86) PCT No.: PCT/EP2021/067050
§ 371 (c)(1),
(2) Date: Dec. 21, 2022

(87) PCT Pub. No.: WO2021/259961
PCT Pub. Date: Dec. 30, 2021

(65) Prior Publication Data
US 2023/0233237 A1    Jul. 27, 2023

Related U.S. Application Data (60) Provisional application No. 63/042,777, filed on Jun. 23, 2020, provisional application No. 63/042,077, filed on Jun. 22, 2020.

(51) Int. Cl.
| | | |
|---|---|---|
| A61B 17/72 | (2006.01) | |
| A61B 17/17 | (2006.01) | |
| A61B 17/86 | (2006.01) | |

(52) U.S. Cl.
CPC ...... *A61B 17/7241* (2013.01); *A61B 17/1717* (2013.01); *A61B 17/86* (2013.01)

(58) Field of Classification Search
CPC . A61B 17/72; A61B 17/7208; A61B 17/7241; A61B 17/725; A61B 17/1717; A61B 17/86
See application file for complete search history.

(56) References Cited

U.S. PATENT DOCUMENTS

2001/0008704 A1* 7/2001 Harder ............... F16C 1/02
                                                    428/596
2002/0107578 A1* 8/2002 Speitling ........... A61L 31/022
                                                    623/23.6
2015/0157371 A1  6/2015 Ehnke
(Continued)

FOREIGN PATENT DOCUMENTS

EP    0919200    5/1999
EP    3449855    3/2019

OTHER PUBLICATIONS

EP0919200 English Abstract.
International Search Report for PCT/EP2021/067050 dated May 30, 2021.

*Primary Examiner* — Eduardo C Robert
*Assistant Examiner* — Holly Joanna Lane
(74) *Attorney, Agent, or Firm* — HUESCHEN AND SAGE (57) ABSTRACT

The present invention relates to an orthopaedic implant and system for fixation of bones and a method for the use of the orthopaedic implant and system. The orthopaedic system finds utility for fixation of bones such as fractures of the tibia, although it may be used in any suitable long bone.

19 Claims, 5 Drawing Sheets

(56) References Cited

U.S. PATENT DOCUMENTS

| | | | |
|---|---|---|---|
| 2016/0256202 A1 | 9/2016 | Halder | |
| 2018/0140424 A1* | 5/2018 | Dees | A61F 2/30734 |
| 2018/0250042 A1* | 9/2018 | Sato | A61B 17/7233 |
| 2018/0344377 A1* | 12/2018 | Mcmanus | A61B 17/72 |
| 2019/0105088 A1 | 4/2019 | Peterson | |
| 2020/0289177 A1* | 9/2020 | Sato | A61B 17/744 |
| 2020/0315678 A1* | 10/2020 | Mazzio | A61B 17/808 |

* cited by examiner

ORTHOPAEDIC IMPLANT AND SYSTEM

FIELD OF THE INVENTION

The present invention relates to an orthopaedic implant and system for fixation of bones and a method for the use of the orthopaedic implant and system. The orthopaedic system finds utility for fixation of bones such as fractures of the tibia, although it may be used in any suitable long bone.

BACKGROUND TO THE INVENTION

Intramedullary nailing of long bones has been well established since the mid-twentieth century and is generally successful in the goal of achieving osseous union, whilst restoring length, alignment and rotation of the fractured bone. Intramedullary nailing carries the advantage of minimal surgical dissection, thus preserving the blood supply and local osteogenic host factors at the fracture site. An intramedullary nail also acts as a load sharing device to allow for early postoperative mobilisation and weight-bearing, aiding a quicker return to function.

The present invention relates preferably to the fixation of tibial fractures, though may be applicable to other long bones.

Various problems exist with current (tibial) nailing systems, including difficulty to achieve fixation in very proximal parts of the bone and absorbing excess stresses on the construct that could lead to fatigue failure and implant breakage. Absorbing these stresses may also facilitate an earlier and greater degree of post-operative weight-bearing. Furthermore, allowing longitudinal (compression-distraction) micromotion across the fracture site may facilitate better bone healing.

SUMMARY OF THE INVENTION

According to a first aspect of the present invention there is provided an orthopaedic implant comprising:
(a) a body for connecting to an intramedullary nail, the body having proximal and distal ends, the proximal and distal ends defining a first longitudinal axis therebetween;
(b) a first aperture at the proximal end of the body for receiving an interlocking screw; and
(c) securing means at the distal end of the body for securing the orthopaedic implant to the intramedullary nail.

Optionally, the first aperture is a transverse aperture.

Optionally, the first aperture is substantially circular in shape.

Optionally, the first aperture is a transverse aperture, which is substantially circular in shape.

Preferably, the first aperture is substantially oblong in shape.

Optionally, the first aperture is a transverse aperture, which is substantially oblong in shape.

Optionally, the first aperture allows for proximal fixation of the interlocking screw.

Optionally, the first aperture is a transverse aperture, which is substantially circular in shape to allow for proximal fixation of the interlocking screw.

Optionally, the first aperture is a transverse aperture, which is substantially oblong in shape to allow for proximal fixation of the interlocking screw.

Optionally, the first aperture substantially perpendicularly intersects the first longitudinal axis.

Optionally, the first aperture is a transverse aperture, which substantially perpendicularly intersects the first longitudinal axis.

Optionally, the first aperture is a transverse aperture, which is substantially oblong in shape and substantially perpendicularly intersects the first longitudinal axis.

Optionally, the first aperture is a transverse aperture, which is substantially circular in shape to allow for proximal fixation of the interlocking screw and substantially perpendicularly intersects the first longitudinal axis.

Preferably, the first aperture is a transverse aperture, which is substantially oblong in shape to allow for proximal fixation of the interlocking screw and substantially perpendicularly intersects the first longitudinal axis.

Optionally, the first aperture comprises two openings on the body of the orthopaedic implant.

Optionally, the first aperture comprises first and second openings on the body of the orthopaedic implant.

Optionally, the first and second openings define a space therebetween.

Optionally, the first and second openings define a space therebetween on the surface of the body of the orthopaedic implant.

Optionally, the first and second openings define a longitudinal space therebetween on the surface of the body of the orthopaedic implant.

Optionally, the longitudinal space between the first and second openings on the surface of the body of the orthopaedic implant defines a top section.

Optionally, the top section opposes a bottom section.

Optionally, the longitudinal space between the first and second openings on the opposite side of the surface of the body of the orthopaedic implant defines a bottom section.

Optionally, the longitudinal space between the first and second openings on the opposite side of the surface of the body of the orthopaedic implant defines a bottom section, wherein the bottom section is opposite the top section.

Optionally, the top section opposes the bottom section, wherein the top section is substantially parallel to the bottom section.

Optionally, a left section is located between the top section and bottom section.

Optionally, a right section is located between the top section and bottom section, wherein the left section opposes the right section.

Optionally, the left section opposes the right section, wherein the left section is substantially parallel to the right section.

Optionally, the securing means is located at the top section.

Optionally, the securing means is located at or adjacent the distal end of the top section Optionally, the securing means is located at or adjacent the distal end of the top section on the surface of the orthopaedic implant.

Optionally, the securing means is located at or adjacent the distal end of the top section on the surface of the orthopaedic implant, which is shaped and dimensioned to receive locking means.

Preferably, the securing means is a groove.

Optionally, the securing means is an aperture.

According to another aspect of the present invention there is provided an orthopaedic implant comprising:
(a) a body for connecting to an intramedullary nail, the body having proximal and distal ends, the proximal and distal ends defining a first longitudinal axis therebetween;

(b) a first aperture at the proximal end of the body for receiving an interlocking screw; and (c) at least one slit on the body Optionally, the or each slit is positioned distally to the first aperture and proximally to the securing means.

Optionally, the or each slit is positioned distally to the first aperture and proximally to the securing means on the bottom section.

Optionally, the or each slit is positioned distally to the first aperture and proximally to the securing means on the bottom section, wherein the at least one slit extends transversely to the first longitudinal axis.

Optionally, the or each slit is positioned distally to the first aperture and proximally to the securing means on the bottom section, wherein the at least one slit extends transversely to the first longitudinal axis and further extends parallel to the first longitudinal axis.

Optionally, the or each slit is positioned on or at the bottom section, distally to the first aperture and proximally to the securing means, wherein the at least one slit extends transversely to the first longitudinal axis from the surface of the orthopaedic implant at or within the bottom section and further extends parallel to the first longitudinal axis, the or each slit opening at or within at least one of the left and right sections.

Optionally, the orthopaedic implant according to a first aspect of the present invention further comprises at least one slit on the body.

Optionally, the orthopaedic implant according to a first aspect of the present invention further comprises at least one slit on the body, the or each slit positioned distally to the first aperture and proximally to the securing means.

Optionally, the orthopaedic implant according to a first aspect of the present invention further comprises at least one slit on the body, the or each slit positioned distally to the first aperture and proximally to the securing means on the bottom section.

Optionally, the orthopaedic implant according to a first aspect of the present invention further comprises at least one transverse slit on the body, the or each slit positioned distally to the first aperture and proximally to the securing means on the bottom section, wherein the at least one slit extends transversely to the first longitudinal axis.

Optionally, the orthopaedic implant according to a first aspect of the present invention further comprises at least one transverse slit on the body, the or each slit positioned distally to the first aperture and proximally to the securing means on the bottom section, wherein the at least one slit extends transversely to the first longitudinal axis and further extends parallel to the first longitudinal axis.

Optionally, the orthopaedic implant according to a first aspect of the present invention further comprises at least one transverse slit on the body, the or each slit positioned on or at the bottom section, distally to the first aperture and proximally to the securing means, wherein the at least one slit extends transversely to the first longitudinal axis from the surface of the orthopaedic implant at or within the bottom section and further extends parallel to the first longitudinal axis, the or each slit opening at or within at least one of the left and right sections.

Optionally, the orthopaedic implant according to a first aspect of the present invention further comprises at least two slits on the body.

Optionally, the orthopaedic implant according to a first aspect of the present invention further comprises at least two slits on the body, the or each slit positioned distally to the first aperture and proximally to the securing means.

Optionally, the orthopaedic implant according to a first aspect of the present invention further comprises at least two slits on the body, the or each slit positioned distally to the first aperture and proximally to the securing means on the bottom section.

Optionally, the orthopaedic implant according to a first aspect of the present invention further comprises at least two transverse slits on the body, the or each slit positioned distally to the first aperture and proximally to the securing means on the bottom section, wherein the at least one slit extends transversely to the first longitudinal axis.

Optionally, the orthopaedic implant according to a first aspect of the present invention further comprises at least two transverse slit on the body, the or each slit positioned distally to the first aperture and proximally to the securing means on the bottom section, wherein the at least one slit extends transversely to the first longitudinal axis and further extends parallel to the first longitudinal axis.

Optionally, the orthopaedic implant according to a first aspect of the present invention further comprises at least two transverse slits on the body, the or each slit positioned on or at the bottom section, distally to the first aperture and proximally to the securing means, wherein the at least one slit extends transversely to the first longitudinal axis from the surface of the orthopaedic implant at or within the bottom section and further extends parallel to the first longitudinal axis, the or each slit opening at or within at least one of the left and right sections.

Optionally, the orthopaedic implant comprises a series of slits on the body.

Optionally, the orthopaedic implant comprises a series of slits on the bottom section of the body.

Optionally, the orthopaedic implant comprises a series of slits, each pair of slits defining a leaf layer therebetween.

Optionally, the orthopaedic implant comprises a series of slits on the bottom section of the body, each pair of slits defining a leaf layer therebetween.

Optionally, the orthopaedic implant comprises a series of leaf layers comprising first, second and subsequent leaf layers.

Optionally, the orthopaedic implant comprises a series of deformable leaf layers comprising first, second and subsequent leaf layers.

Optionally, the orthopaedic implant comprises a series of deformable leaf layers comprising first, second and subsequent leaf layers, wherein each of the first, second and subsequent leaf layers comprise a first, second and actuating position.

Optionally, in the first position, there is no engagement between leaf layers.

Optionally, in the second position, there is engagement between leaf layers.

Optionally, in the second position, there is engagement between leaf layers if a first force is applied.

Optionally, the first force deforms a leaf layer from the first position to the second position.

Optionally, the first force defines a threshold force, which deforms a leaf layer from the first position to the second position.

Optionally, in the actuating position, there is engagement between leaf layers and movement of first, second and/or subsequent leaf layers.

Optionally, in the actuating position, there is engagement between leaf layers and movement of first, second and/or subsequent leaf layers if a second force is applied.

Optionally, the second force deforms a leaf layer from the second position to the actuating position.

Optionally, the second force defines a threshold force, which deforms a leaf layer from the second position to the actuating position.

Optionally, the first leaf layer deforms from the first position to the second position when the first force is applied.

Optionally, the first leaf layer deforms from the second position to the actuating position if the second force is applied.

Optionally, the first leaf layer deforms from the second position to the actuating position and causes engagement of the second leaf layer, wherein the second leaf layer deforms from the first position to the second position if a threshold force is applied.

Optionally, the first leaf layer deforms from the second position to the actuating position and causes engagement of the second leaf layer if the second force is applied, wherein the second leaf layer deforms from the second position to the actuating position.

Optionally, the first leaf layer deforms from the second position to the actuating position and causes engagement of the second leaf layer if the second force is applied, wherein the second leaf layer deforms from the second position to the actuating position and causes engagement of subsequent leaf layers.

Optionally, the orthopaedic implant comprises a series of slits on the bottom section of the body, which are at least 0.05 mm apart, to form a series of deformable leaf layers comprising first, second and subsequent leaf layers, Optionally, the orthopaedic implant comprises a series of slits on the bottom section of the body, which are at least 0.10 mm apart, to form a series of deformable leaf layers comprising first, second and subsequent leaf layers, Optionally, the orthopaedic implant comprises a series of slits on the bottom section of the body, which are at least 0.15 mm apart, to form a series of deformable leaf layers comprising first, second and subsequent leaf layers, Preferably, the orthopaedic implant according to a first aspect of the present invention is a strut.

According to a second aspect of the present invention there is provided an orthopaedic system for the fixation of bones comprising:
(a) an orthopaedic implant according to a first aspect of the present invention;
(b) an intramedullary nail for receiving the orthopaedic implant comprising a second aperture and defining a second longitudinal axis; and
(c) locking means at the proximal end of the intramedullary nail for locking the orthopaedic implant to the intramedullary nail.

Optionally, the second aperture is a transverse aperture.

Optionally, the second aperture intersects the second longitudinal axis. Optionally, the second aperture is a transverse aperture intersecting the second longitudinal axis.

Optionally, the second aperture is substantially circular in shape.

Optionally, the second aperture is a transverse aperture intersecting the second longitudinal axis, which is substantially circular in shape.

Preferably, the second aperture is substantially oblong in shape

Optionally, the second aperture is a transverse aperture, which is substantially oblong in shape.

Optionally, the second aperture is a transverse aperture intersecting the second longitudinal axis, which is substantially oblong in shape.

Optionally, the second aperture is positioned at the proximal end of the intramedullary nail.

Optionally, the second aperture is a transverse aperture positioned at the proximal end of the intramedullary nail.

Optionally, the second aperture is a transverse aperture intersecting the second longitudinal axis, which is positioned at the proximal end of the intramedullary nail.

Optionally, the second aperture is a transverse aperture intersecting the second longitudinal axis at the proximal end of the intramedullary nail, which is substantially oblong in shape.

Optionally, the second aperture is shaped and dimensioned to receive the orthopaedic implant according to a first aspect of the present invention.

Optionally, the second aperture is a transverse aperture shaped and dimensioned to receive the orthopaedic implant according to a first aspect of the present invention.

Optionally, the second aperture is a transverse aperture intersecting the second longitudinal axis, which is shaped and dimensioned to receive the orthopaedic implant according to a first aspect of the present invention.

Optionally, the second aperture is a transverse aperture intersecting the second longitudinal axis at the proximal end of the intramedullary nail, which is shaped and dimensioned to receive the orthopaedic implant according to a first aspect of the present invention.

Optionally, the second aperture is a transverse aperture intersecting the second longitudinal axis at the proximal end of the intramedullary nail, which is substantially oblong in shape and is shaped and dimensioned to receive the orthopaedic implant according to a first aspect of the present invention.

Optionally, the orthopaedic implant according to a first aspect of the present invention is positioned in the second aperture.

Optionally, the orthopaedic implant according to a first aspect of the present invention is positioned in the second aperture and the securing means on the body the orthopaedic implant is aligned with second longitudinal axis Preferably, the intramedullary nail comprises an inner threaded surface.

Optionally, the locking means is threadably mountable to the inner threaded surface of the intramedullary nail.

Optionally, the locking means is threadably mountable to the inner threaded surface of the intramedullary nail at the proximal end.

Optionally, the locking means is threadably mountable to the inner threaded surface of the intramedullary nail at the proximal end, wherein rotation of the locking means causes the locking means to advance distally along the second longitudinal axis.

Optionally, the locking means is threadably mountable to the inner threaded surface of the intramedullary nail at the proximal end, wherein rotation of the locking means causes the locking means to advance distally along the second longitudinal axis and engage with the securing means.

Optionally, the locking means is threadably mountable to the inner threaded surface of the intramedullary nail at the proximal end, wherein rotation of the locking means causes the locking means to advance distally along the second longitudinal axis and engage with the securing means, thereby locking the orthopaedic implant according to a first aspect of the present invention.

Optionally, the locking means is threadably mountable to the inner threaded surface of the intramedullary nail at the proximal end, wherein rotation of the locking means causes the locking means to advance distally along the second longitudinal axis and engage with the securing means, thereby locking the orthopaedic implant according to a first aspect of the present invention and achieving mechanical communication with the intramedullary nail.

Optionally, the second aperture is positioned at any given angle relative to the second longitudinal axis.

Optionally, the second aperture is positioned between 0-150° relative to the second longitudinal axis.

Optionally, the second aperture is positioned between 0-120° relative to the second longitudinal axis.

Optionally, the second aperture is positioned between 0-90° relative to the second longitudinal axis.

Optionally, the second aperture is positioned perpendicularly relative to the second longitudinal axis.

Optionally, the second aperture is positioned between 0-60° relative to the second longitudinal axis.

Optionally, the second aperture is positioned between 0-30° relative to the second longitudinal axis.

Optionally, the second aperture is positioned between 0-15° relative to the second longitudinal axis.

Preferably, the locking means comprises a set-screw.

Optionally, the intramedullary nail further comprises a third aperture.

Optionally, the third aperture is a transverse aperture.

Optionally, the third aperture is a transverse aperture intersecting the second longitudinal axis.

Optionally, the third aperture is a transverse aperture intersecting the second longitudinal axis, which is substantially circular in shape.

Optionally, the third aperture is a transverse aperture intersecting the second longitudinal axis, which is substantially oblong in shape.

Optionally, the third aperture is a transverse aperture intersecting the second longitudinal axis at the proximal end of the intramedullary nail, which is substantially oblong in shape.

Optionally, the third aperture is a transverse aperture intersecting the second longitudinal axis at the proximal end of the intramedullary nail, which is substantially circular in shape, and is shaped and dimensioned to receive an interlocking screw.

Optionally, the third aperture is a transverse aperture intersecting the second longitudinal axis at the proximal end of the intramedullary nail, which is substantially oblong in shape, and is shaped and dimensioned to receive an interlocking screw.

Optionally, the third aperture is a transverse aperture intersecting the second longitudinal axis at the proximal end of the intramedullary nail, which is substantially circular in shape, and is shaped and dimensioned to receive an interlocking screw to allow for controlled, coordinated movement facilitated by the orthopaedic implant according to a first aspect of the present invention.

Optionally, the third aperture is a transverse aperture intersecting the second longitudinal axis at the proximal end of the intramedullary nail, which is substantially oblong in shape, and is shaped and dimensioned to receive an interlocking screw to allow for controlled, coordinated movement facilitated by the orthopaedic implant according to a first aspect of the present invention.

Optionally, the intramedullary nail further comprises a fourth aperture.

Optionally, the fourth aperture is a transverse aperture.

Optionally, the fourth aperture is a transverse aperture intersecting the second longitudinal axis.

Optionally, the fourth aperture is a transverse aperture intersecting the second longitudinal axis, which is substantially circular in shape.

Optionally, the fourth aperture is a transverse aperture intersecting the second longitudinal axis, which is substantially oblong in shape.

Optionally, the fourth aperture is a transverse aperture intersecting the second longitudinal axis at the proximal end of the intramedullary nail, which is substantially oblong in shape.

Optionally, the fourth aperture is a transverse aperture intersecting the second longitudinal axis at the proximal end of the intramedullary nail, which is substantially circular in shape, and is shaped and dimensioned to receive an interlocking screw.

Optionally, the fourth aperture is a transverse aperture intersecting the second longitudinal axis at the proximal end of the intramedullary nail, which is substantially oblong in shape, and is shaped and dimensioned to receive an interlocking screw.

Optionally, the fourth aperture is a transverse aperture intersecting the second longitudinal axis at the proximal end of the intramedullary nail, which is substantially circular in shape, and is shaped and dimensioned to receive an interlocking screw to allow for controlled, coordinated movement facilitated by the orthopaedic implant according to a first aspect of the present invention.

Optionally, the fourth aperture is a transverse aperture intersecting the second longitudinal axis at the proximal end of the intramedullary nail, which is substantially oblong in shape, and is shaped and dimensioned to receive an interlocking screw to allow for controlled, coordinated movement facilitated by the orthopaedic implant according to a first aspect of the present invention.

Optionally, the orthopaedic system is used for the fixation of any bone.

Optionally, the orthopaedic system is used for the fixation of any long bone.

Preferably, the orthopaedic system is used for the fixation of the tibia.

Further preferably, the orthopaedic system is used for the fixation of the proximal end of the tibia.

According to a further aspect of the present invention, there is provided a method for fixation of long bones, the method comprising the steps of reducing the fracture; providing a channel for the intramedullary nail; inserting an intramedullary nail according to a second aspect of the invention in the channel; providing a channel for the orthopaedic implant and inserting an orthopaedic implant according to a first aspect of the invention in the channel.

Optionally, the fixing step comprises locking the orthopaedic implant through a transverse aperture in the intramedullary nail by a set-screw, or similar locking means, through the proximal end of the intramedullary nail until engagement with a groove, or similar securing means, on the orthopaedic implant.

BRIEF DESCRIPTION OF THE DRAWINGS

Embodiments of the invention will now be described with reference to the accompanying drawings, in which.

DETAILED DESCRIPTION OF THE INVENTION

Figure 1:
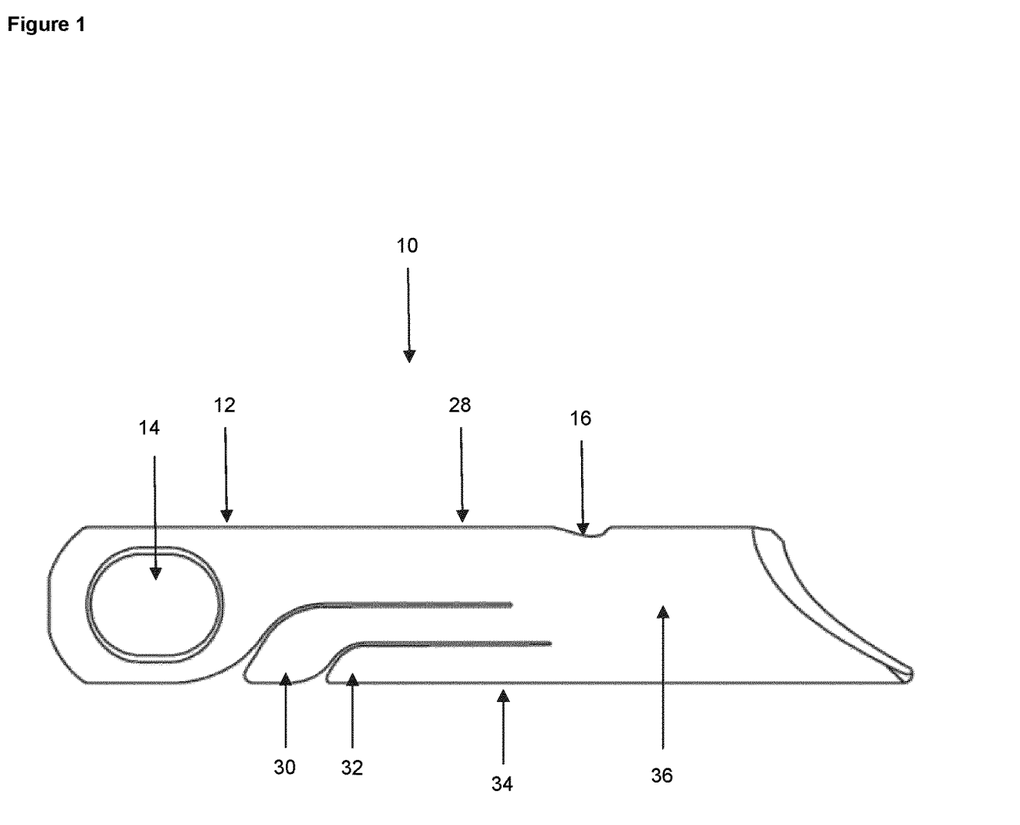
FIG. 1 is a perspective view of a representative orthopaedic implant according to a first aspect of the present invention.
Figure 2:
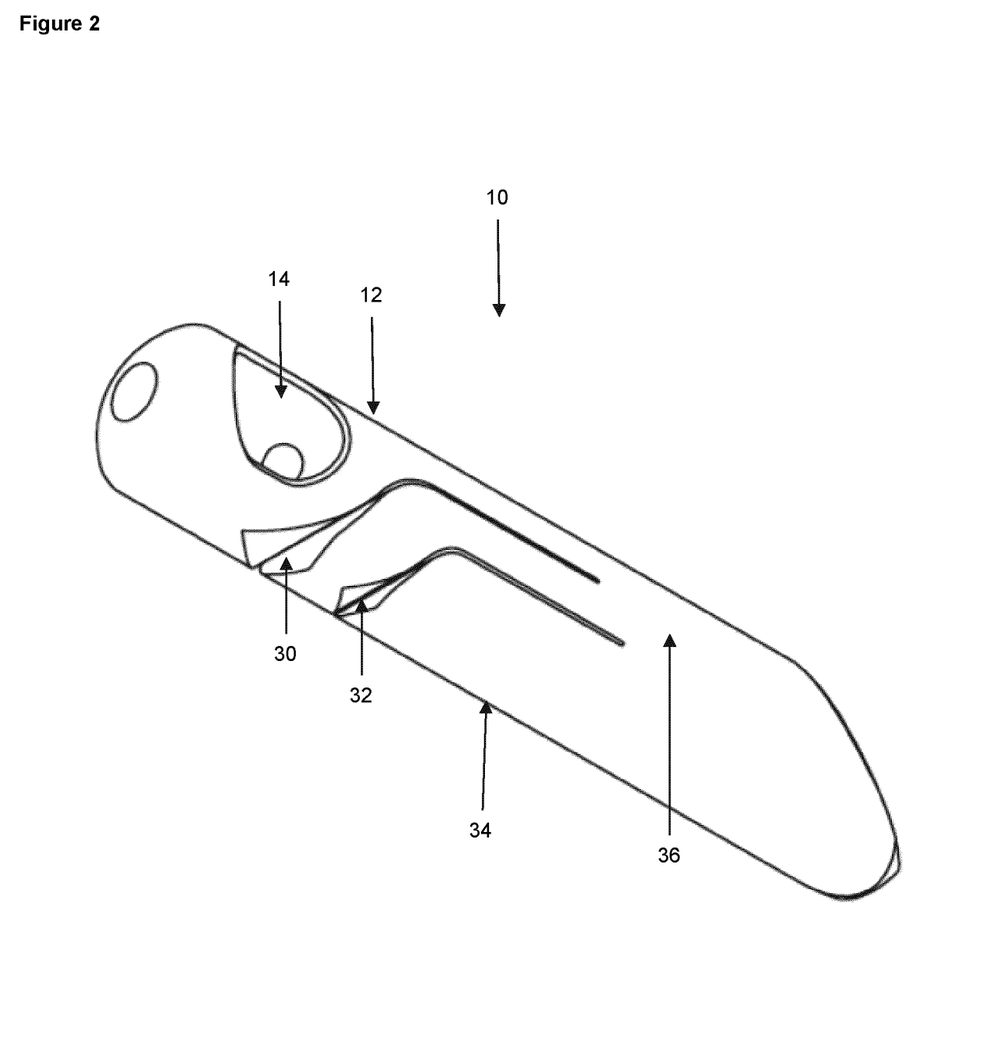
FIG. 2 is a perspective view of a representative orthopaedic implant according to a first aspect of the present invention showing the deformable slits.
Figure 5:
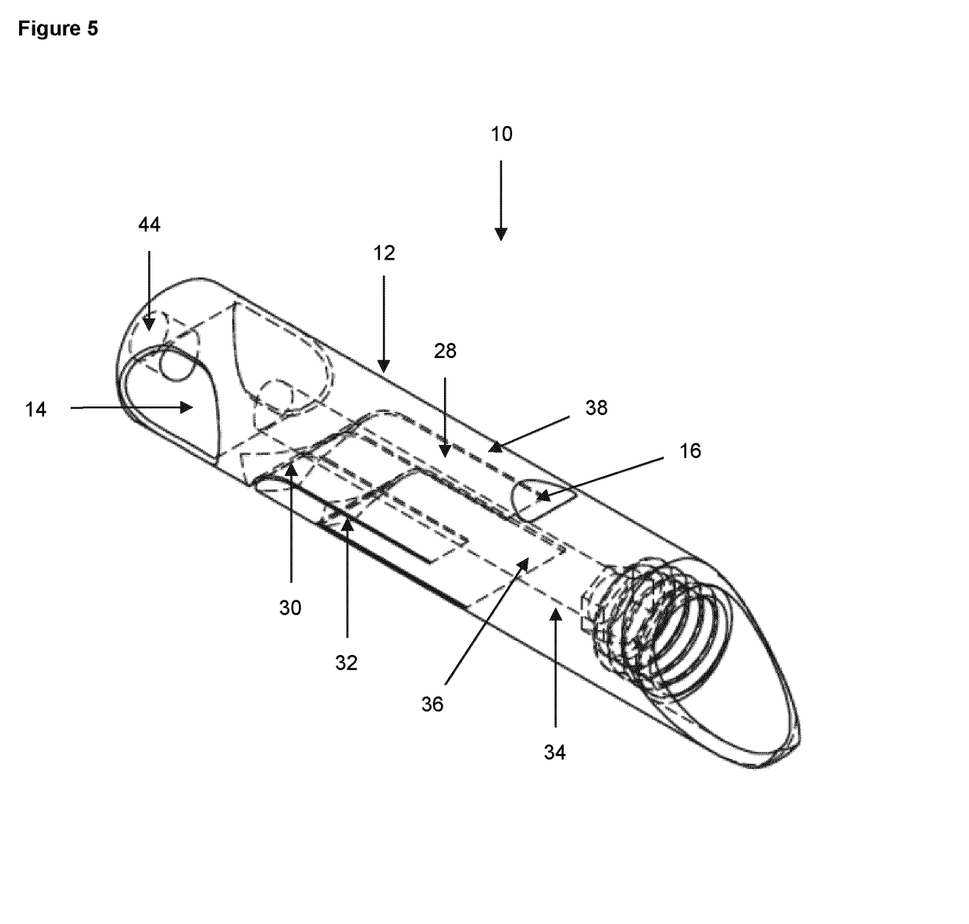
FIG. 5 is a sectional view of a representative orthopaedic implant according to a first aspect of the present invention.

Referring to FIG. 1, FIG. 2 and FIG. 5 of the drawings, there is provided an orthopaedic implant 10 according to a first embodiment of the present invention. The orthopaedic implant 10 comprises a body 12 for connecting to an intramedullary nail having proximal and distal ends defining a first longitudinal axis, a first aperture 14 at the proximal end of the body for receiving an interlocking screw, and securing means 16, which in this embodiment is a groove, at the distal end of the body for securing the orthopaedic implant to the intramedullary nail.

Figure 3:
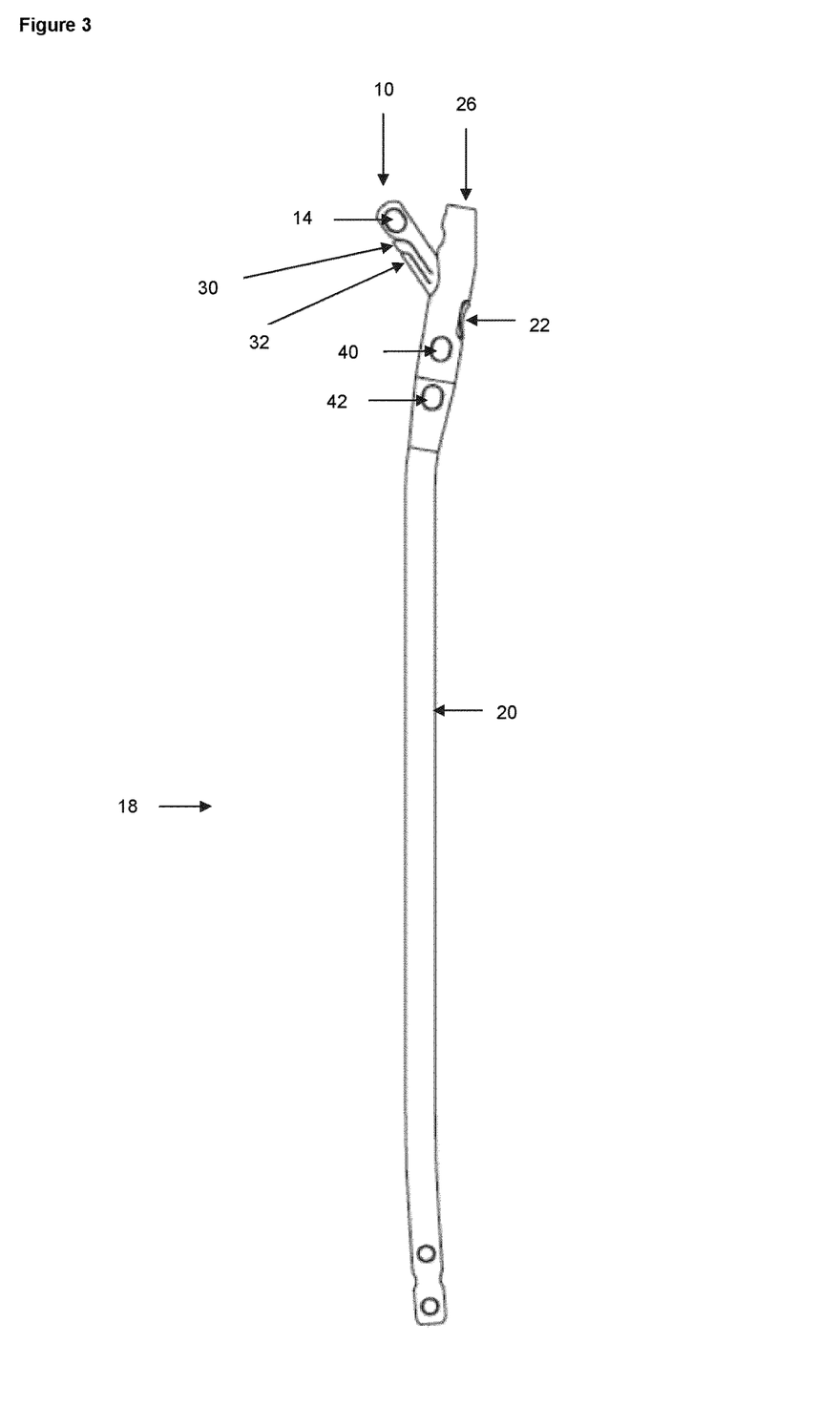
FIG. 3 is a perspective view of a representative orthopaedic system according to a second aspect of the present invention.
Figure 4:
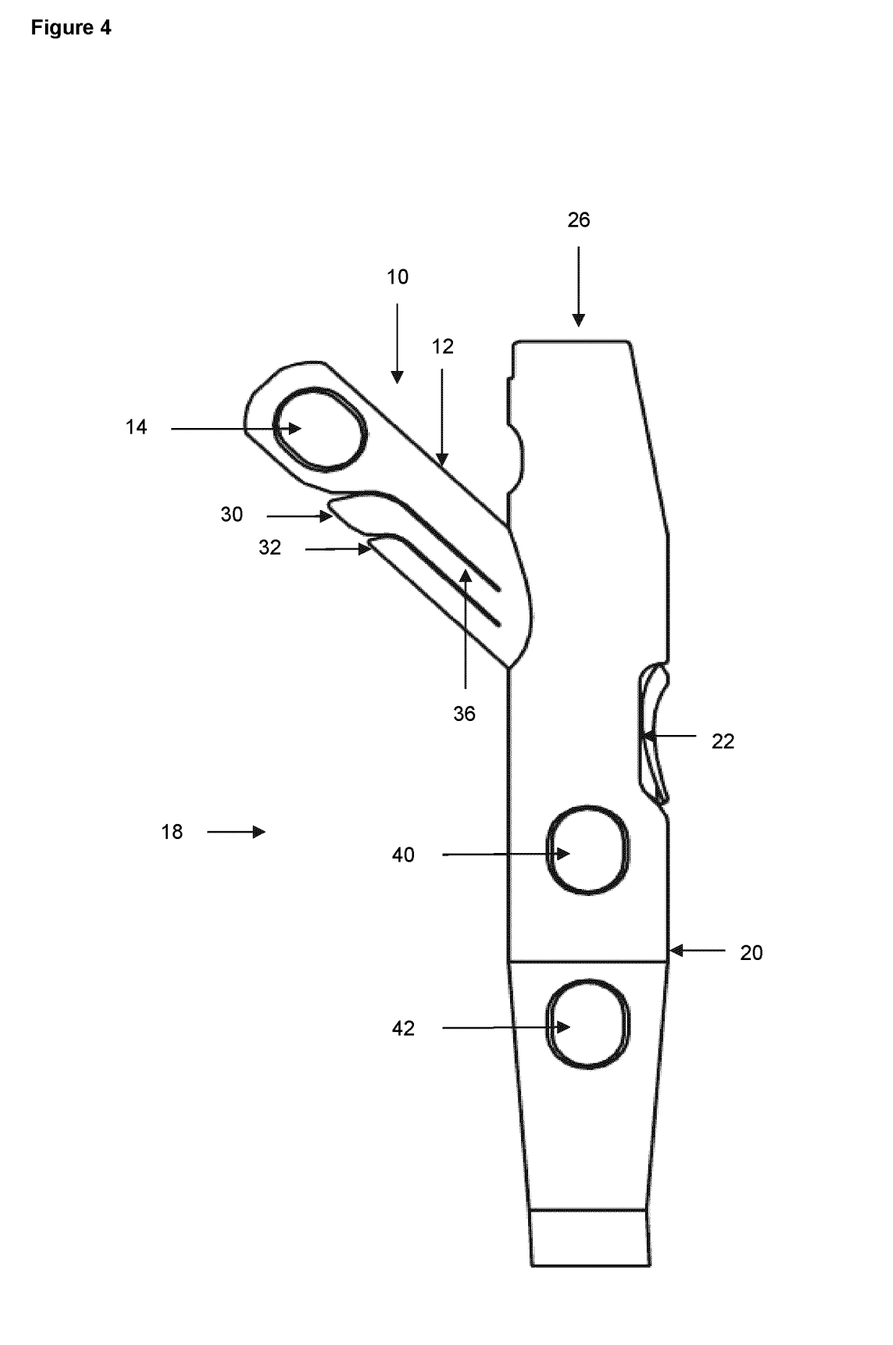
FIG. 4 is a perspective view of a representative orthopaedic system according to a second aspect of the present invention showing the proximal connection of the orthopaedic implant according to a first aspect of the present invention to the intramedullary nail.

Referring to FIG. 3 and FIG. 4 of the drawings, there is provided an orthopaedic system 18 according to a second embodiment of the present invention. The orthopaedic system 18 comprises a orthopaedic implant 10 according to a first aspect of the present invention, an intramedullary nail 20 comprising a second aperture 22 for receiving the orthopaedic implant 10 defining a second longitudinal axis, and locking means 24, which in this embodiment is a set-screw (not shown), at the proximal end of the intramedullary nail 20 for locking the orthopaedic implant 10 to the intramedullary nail 20.

To assemble the orthopaedic system 18, a channel for the intramedullary nail 20 is provided and the intramedullary nail 20 is inserted into the channel. A channel is also provided for the orthopaedic implant 10, which is then inserted into the channel and through the second aperture 22 on the intramedullary nail 20. The body 12 of the orthopaedic implant 10 is generally cylindrical in shape and is arranged such that the groove 16 on the top section 28 of the body 12 is aligned with the second longitudinal axis of the orthopaedic implant 10. The proximal end of the intramedullary nail 20 comprises an inner threaded longitudinal recess 26 for receiving a set-screw 24. A set-screw 24 is threadably mountable to the longitudinal recess 26 of the intramedullary nail 20. The outer surface of the set-screw 24 is dimensioned and arranged to provide means for actuating the set screw 24, for example by providing means for delivering torque to the set-screw 24. The outer surface of the set-screw 24 can be dimensioned and arranged to receive a torque delivery device such as a screwdriver, hex key, or similar device. The set-screw 24, by the application of torque, is driven through the longitudinal recess 26 of the intramedullary nail 20 in the direction of the longitudinal axis of intramedullary nail 20 the towards the groove 16 on the surface of the orthopaedic implant 10 until the set-screw 24 engages with the groove 16, thus ensuring the orthopaedic implant 10 is locked into place and does not move under external pressure from the surrounding bone, with which it is in contact.

In a further embodiment, a traditional interlocking screw is positioned through the first aperture 14 on the orthopaedic implant 10. In a further embodiment, the intramedullary nail 20 comprises a third aperture 40, fourth aperture 42, and/or subsequent apertures, for traditional interlocking screws.

In an alternative assembly of the orthopaedic system 18, and in another embodiment, the connecting orthopaedic implant 10 may be locked in place in the intramedullary nail 20 by means of screw threads on the outer circumference of the orthopaedic implant 10 and inner circumference of the second aperture 22. The orthopaedic implant 10 is generally cylindrical in shape and the proximal end of the orthopaedic implant 10 comprises a notch 44 to actuate the orthopaedic implant 10. The proximal end of the orthopaedic implant 10 is dimensioned and arranged to provide means for actuating the orthopaedic implant 10, for example by providing means for delivering torque to the orthopaedic implant 10. The proximal end of the orthopaedic implant 10 can be dimensioned and arranged to receive a torque delivery device such as a screwdriver, hex key, or similar device. A hexagonal socket (not shown) can be provided at the proximal end of the orthopaedic implant 10, and can be shaped and adapted to receive a hex key or similar torque delivery device.

The bottom section 34 of the body 12 comprises a series of deformable slits that extend transversely to the first longitudinal axis and further extends parallel to the first longitudinal axis along the left 36 and right 38 sections. The deformable slits on the bottom section 34 of the body 12 form a series of leaf layers.

In use, as weight-bearing force is applied to the orthopaedic system 18, the orthopaedic implant 10 will resiliently deflect via the first leaf layer 30. The first leaf layer 30, starting from a first position, will deform to a second position, and if weight-bearing force is continued, the second position will deform to an actuating position and engage the second leaf layer 32, which provides increased resilient support to resist deflection, absorbs excess stress on the orthopaedic system 18 to prevent fatigue failure, prevents damage to the orthopaedic implant 10 and helps prevent fatigue damage the interlocking screw. If weight-bearing force is removed, the first deformable slit will revert back to the first position. However, if weight-bearing force is continued, the second deformable left layer 32, starting from a first position, will deform to a second position, and if weight-bearing force is continued, the second position will deform to an actuating position and engage subsequent leaf layers.

The engagement of the first leaf layer 30 to the second leaf layer 32, and subsequent leaf layers, allows for movement in a vertical direction along the longitudinal axis of the tibia to enable a compression and distraction micromotion at the fracture site, which is beneficial to accelerate and mature bone healing.

The orthopaedic implant 10 of the present invention is formed of a material that is suitable for sterilisation, such as an autoclavable material, so as to be provided in a sterile packaged state for use. The material can be surgical titanium alloy, which is flexible, but it will be seen that any flexible material that is suitable for sterilisation and can impart the required mechanical strength and flexibility may be used.

The intramedullary nail 20 of the orthopaedic system 18 is formed of a material that is suitable for sterilisation, such as an autoclavable material, so as to be provided in a sterile packaged state for use. The material can be titanium alloy or surgical stainless steel, but it will be seen that any material that is suitable for sterilisation and can impart the required mechanical strength may be used.

The present invention finds utility as an apparatus for fixation of long bones such as fractures of the tibia, and more specifically, the proximal tibia.

There is also provided a method for fixation of bones comprising the steps of reducing the fracture by utility of the orthopaedic system 18. The tibial nailing surgical technique is similar to traditional infrapatellar or suprapatellar tibial nailing, with the exception of the innovative configuration at the proximal interlocking screw mechanism.

The tibial fracture should first be reduced, or deemed reducible, by closed or open means. Open reduction should be considered if anatomic alignment cannot be achieved by closed means. The ideal starting point is the anterior edge of the tibial plateau, just medial to the lateral tibial spine. The traditional starting point is infrapatellar, either by splitting the patellar tendon or medial to the patellar tendon. Using this traditional infrapatellar technique, the knee is in a flexed or hyper-flexed position.

Suprapatellar tibial nailing has recently gained in popularity and is performed in the semi-extended position, with access to the proximal tibia through the knee joint. Surgical instrumentation has been developed to ensure minimal damage to the intraarticular structures. The procedure is performed with the knee flexed approximately 15-20°. A small longitudinal incision is made about 3-5 cm above the patella. The quadriceps tendon is split in a longitudinal fashion and the patellofemoral joint is entered through further blunt dissection. A cannula system and blunt trochar is inserted through the patellofemoral joint to the starting point at the junction of the anterior cortex of the proximal tibia and the articular surface. The starting point is established under fluoroscopic guidance using a guide pin. Reaming of the canal and tibial nail insertion is performed through the cannula system which provides protection to the surrounding soft tissues and articular structures.

After fracture reduction, a guidewire is placed down the intramedullary canal across the fracture site and centrally into the distal tibia, under fluoroscopic guidance. The canal is prepared by successive sized reamers, to match and accommodate the diameter of the intramedullary nail.

The intramedullary nail length and diameter are determined by pre-operative planning and/or by using a ruler and fluoroscopic guidance. The correctly sized intramedullary nail is mounted on an alignment jig. The intramedullary nail is inserted over the guidewire, which is then removed.

Traditionally, interlocking screws are placed proximally and distally to prevent shortening and malrotation. Placement of proximal interlocking screws is typically performed via the alignment jig that is attached to the nail. The distal interlocking screws are most commonly inserted via a freehand technique under fluoroscopic guidance. Appropriate awareness of the nearby neurovascular structures is required, and the insertion of interlocking screws must be performed in a manner protective of the soft tissues.

The present invention has a proximal interlocking configuration that includes a connecting orthopaedic implant 10, inserted from anteroinferior through the intramedullary nail 20 and upwards into the proximal tibial metaphysis, posterior to the intramedullary nail 20, to just below the level of the top of the intramedullary nail 20. A channel for the orthopaedic implant 10 had been pre-prepared with a drill through the alignment jig, in a traditional fashion using a surgical drill, or similar device.

The primary purpose of the orthopaedic implant 10 is to allow fixation more proximally, via the orthopaedic implant 10 itself and via its transverse interlocking screw, than otherwise would be possible with traditional interlocking through the intramedullary nail The connecting orthopaedic implant 10 is locked into place in the intramedullary nail 20 using a pre-loaded set-screw located at the proximal end 26 of the intramedullary nail 20. The set-screw is actuated by a screwdriver through the proximal end 26 of the intramedullary nail 20. The screwdriver may need to have a flexible shaft.

The invention claimed is:

1. An orthopaedic implant, comprising:
    (a) a body for connecting to an intramedullary nail, the body having proximal and distal ends, the proximal and distal ends defining a first longitudinal axis therebetween;
    (b) a first aperture at the proximal end of the body for receiving an interlocking screw; and
    (c) securing means at the distal end of the body for securing the orthopaedic implant to the intramedullary nail:
    wherein the first aperture substantially perpendicularly intersects the first longitudinal axis;
    wherein the first aperture is a transverse aperture, which is substantially oblong in shape;
    wherein the first aperture comprises first and second openings on the body of the orthopaedic implant, wherein the first and second openings define a longitudinal space therebetween on the surface of the body of the orthopaedic implant, wherein the longitudinal space between the first and second openings on the surface of the body of the orthopaedic implant defines a top section opposing a bottom section, wherein the top section is substantially parallel to the bottom section, and wherein a left section is located between the top section and bottom section opposing a right section, wherein the left section is substantially parallel to the right section; and
    wherein the orthopaedic implant comprises a series of slits on the bottom section of the body, which are at least 0.05 mm apart, to form a series of deformable leaf layers comprising first, second and subsequent leaf layers.

2. The orthopaedic implant according to claim 1 wherein the securing means are located at or adjacent the distal end of the top section.

3. The orthopaedic implant according to claim 1 wherein the securing means is a groove.

4. The orthopaedic implant according to claim 1, further comprising at least one slit on the body, the or each slit positioned distally to the first aperture and proximally to the securing means.

5. The orthopaedic implant according to claim 1, further comprising at least one transverse slit on the body, the or each slit positioned on or at the bottom section, distally to the first aperture and proximally to the securing means, wherein the at least one slit extends transversely to the first longitudinal axis from the surface of the orthopaedic implant at or within the bottom section and further extends parallel to the first longitudinal axis, the or each slit opening at or within at least one of the left and right sections.

6. The orthopaedic implant according to claim 1, wherein the orthopaedic implant comprises a series of slits on the body, each pair of slits defining a series of deformable leaf layers comprising at least first, second and subsequent leaf layers, wherein each of the first, second and subsequent leaf layers comprise a first, second and actuating position.

7. The orthopaedic implant according to claim 6, wherein, in the first position, there is no engagement between leaf layers; in the second position, there is engagement between leaf layers when a first force is applied, which deforms a leaf layer from the first position to the second position; and, in the actuating position, there is engagement between leaf layers and movement of first, second and/or subsequent leaf layers when a second force is applied, which deforms a leaf layer from the second position to the actuating position.

8. The orthopaedic implant according to claim 1 wherein the orthopaedic implant is a strut.

9. An orthopaedic system for the fixation of bones comprising:
(a) an orthopaedic implant according to claim 1;
(b) an intramedullary nail for receiving the orthopaedic implant comprising a second aperture and defining a second longitudinal axis; and
(c) locking means at the proximal end of the intramedullary nail for locking the orthopaedic implant to the intramedullary nail.

10. The orthopaedic system according to claim 9, wherein the second aperture is a transverse aperture intersecting the second longitudinal axis, which is positioned at the proximal end of the intramedullary nail.

11. The orthopaedic system according to claim 9, wherein the second aperture is a transverse aperture shaped and dimensioned to receive the orthopaedic implant.

12. The orthopaedic system according to claim 9, wherein the orthopaedic implant is positioned in the second aperture and the securing means on the body the orthopaedic implant is aligned with second longitudinal axis.

13. The orthopaedic system according to claim 9, wherein the intramedullary nail comprises an inner threaded surface.

14. The orthopaedic system according to claim 13, wherein the locking means is threadably mountable to the inner threaded surface of the intramedullary nail at the proximal end, wherein rotation of the locking means causes the locking means to advance distally along the second longitudinal axis and engage with the securing means, thereby locking the orthopaedic implant.

15. The orthopaedic system according to claim 9, wherein the second aperture is positioned between 0-150° relative to the second longitudinal axis.

16. The orthopaedic system according to claim 9, wherein the intramedullary nail further comprises a third aperture, which is a transverse aperture intersecting the second longitudinal axis, and which is substantially oblong in shape.

17. The orthopaedic system according to claim 9, wherein the intramedullary nail further comprises a fourth aperture, which is a transverse aperture intersecting the second longitudinal axis, and which is substantially oblong in shape.

18. The method for fixation of long bones, the method comprising the steps of:
(a) reducing the fracture;
(b) providing a channel for an intramedullary nail;
(c) inserting an intramedullary nail in the channel;
(d) providing a channel for an orthopaedic implant and
(e) inserting an orthopaedic implant according to claim 1 in the channel.

19. The method according to claim 18, wherein the fixing step comprises locking the orthopaedic implant through a transverse aperture in the intramedullary nail, through the proximal end of the intramedullary nail until engagement with the securing means on the orthopaedic implant.

\* \* \* \* \*